United States Patent
Szczepaniak et al.

(10) Patent No.: US 10,358,114 B2
(45) Date of Patent: Jul. 23, 2019

(54) METHOD AND APPARATUS FOR DYNAMIC VEHICLE KEY GENERATION AND HANDLING

(71) Applicant: FORD GLOBAL TECHNOLOGIES, LLC, Dearborn, MI (US)

(72) Inventors: Alex Szczepaniak, Ann Arbor, MI (US); Michael McQuillen, Warren, MI (US); Gopichandra Surnilla, West Bloomfield, MI (US); Radhakrishnan Swaminathan, Grand Blanc, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/496,658

(22) Filed: Apr. 25, 2017

(65) Prior Publication Data

US 2018/0304856 A1  Oct. 25, 2018

(51) Int. Cl.
| | |
|---|---|
| *H04L 9/32* | (2006.01) |
| *G07C 9/00* | (2006.01) |
| *H04W 12/06* | (2009.01) |
| *B60R 25/24* | (2013.01) |
| *H04L 9/08* | (2006.01) |

(52) U.S. Cl.
CPC ............... *B60R 25/24* (2013.01); *G07C 9/00* (2013.01); *G07C 9/00111* (2013.01); *G07C 9/00119* (2013.01); *G07C 9/00182* (2013.01); *H04L 9/088* (2013.01); *H04L 9/0861* (2013.01); *B60R 2325/108* (2013.01); *G07C 2009/0038* (2013.01); *G07C 2009/00214* (2013.01); *G07C 2009/00222* (2013.01); *G07C 2009/00373* (2013.01); *G07C 2009/00396* (2013.01)

(58) Field of Classification Search
CPC ............ G07C 2209/63; G07C 2209/64; G07C 2009/00865; G07C 9/00309; G07C 2009/00793; G07C 2009/00888; G07C 9/00007; G07C 9/00857; G07C 9/00119; G07C 9/00111; G07C 9/00182; G07C 2009/00214; G07C 2009/00222; G07C 2009/00373; G07C 2009/0038; G07C 2009/00396; B60R 25/24; B60R 2325/205; G06F 17/00; H04B 1/3816; H04L 63/0492; H04L 63/0853; H04L 63/18; H04W 12/06
See application file for complete search history.

(56) References Cited

U.S. PATENT DOCUMENTS

| | | | |
|---|---|---|---|
| 9,002,536 B2 | 4/2015 | Hatton | |
| 2013/0259232 A1* | 10/2013 | Petel | .................. H04L 63/0492 380/270 |
| 2014/0086177 A1* | 3/2014 | Adjakple | .............. H04W 12/08 370/329 |

(Continued)

*Primary Examiner* — Dionne Pendleton
(74) *Attorney, Agent, or Firm* — Frank Lollo; Brooks Kushman P.C.

(57) ABSTRACT

A system includes a processor configured to generate a new access key, responsive to a vehicle shutdown. The processor is also configured to connect to a previously identified user wireless device. The processor is further configured to deliver the new access key to the user wireless device, responsive to connection to the wireless device and locally store a copy of the new access key in a file designated for reference for a next-access attempt.

10 Claims, 7 Drawing Sheets

(56) References Cited

U.S. PATENT DOCUMENTS

| | | | |
|---|---|---|---|
| 2016/0037307 A1* | 2/2016 | Roth | H04W 4/046 709/206 |
| 2017/0092028 A1* | 3/2017 | Weicker | G07C 9/00039 |
| 2017/0349141 A1* | 12/2017 | Stefan | B60R 25/102 |
| 2018/0123804 A1* | 5/2018 | Smith | H04W 76/10 |
| 2018/0144563 A1* | 5/2018 | Reymann | E05F 15/76 |

* cited by examiner

METHOD AND APPARATUS FOR DYNAMIC VEHICLE KEY GENERATION AND HANDLING

TECHNICAL FIELD

The illustrative embodiments generally relate to methods and apparatuses for dynamic vehicle key generation and handling.

BACKGROUND

The notion of keyless entry and startup has begun to become the norm in the automobile industry. Many vehicles come equipped with pushbutton starting, which simply requires a vehicle fob with a transponder to be present in the vehicle when the button is pushed. In a similar manner, the presence of the fob can be the basis for keyless touch-entry.

While the current models rely on the fob, which is largely a manufacturer controlled device, many proposals have been made for methodologies reliant on digital keys included with a mobile device such as a phone.

SUMMARY

In a first illustrative embodiment, a system includes a processor configured to generate a new access key, responsive to a vehicle state-change. The processor is also configured to connect to a previously identified user wireless device. The processor is further configured to deliver the new access key to the user wireless device, responsive to connection to the wireless device and locally store a copy of the new access key in a file designated for reference for a next-access attempt.

In a second illustrative embodiment, a system includes a processor configured to receive a first newly generated vehicle access key from a vehicle. The processor is also configured to obtain device-identifying parameters. The processor is further configured to attempt connection with a device identified by the device-identifying parameters and deliver a copy of the first newly generated vehicle access key to the device, responsive to successful connection.

In a third illustrative embodiment, a system includes a processor configured to send a polling signal to a user wireless device, responsive to detected engagement of a vehicle capacitive member. The processor is also configured to receive a response to the polling signal from the wireless device, including both an encrypted key and a signal usable to detect proximity of the wireless device to the vehicle. Also, the processor is configured to provide a requested level of access to the vehicle, responsive to verification of the encrypted key as valid and the detected proximity of the wireless device being within a predefined threshold.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
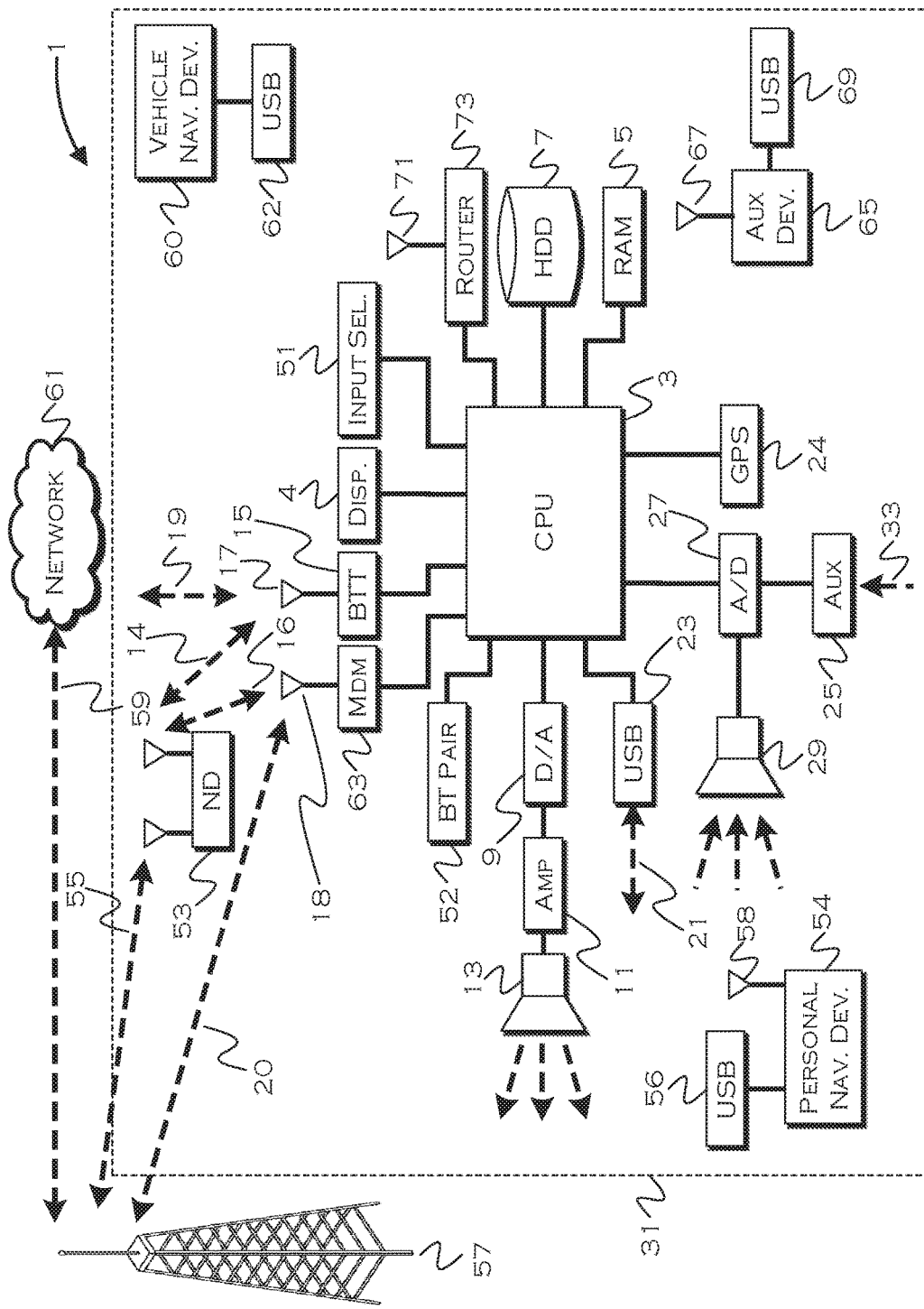
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments propose systems and methods that leverage both the presence of a wearable device and close-proximity wireless communication to establish an unlock and ignition paradigm. In addition to detecting a wearable (or other mobile) device in close proximity, when an unlock request is processed, for example, the system uses a continual code generation process, which refreshes the unlock and/or start codes on a per-cycle basis. This helps prevent replay attacks and other mechanisms that might be used to inappropriately take control of a vehicle.

Figure 2A:
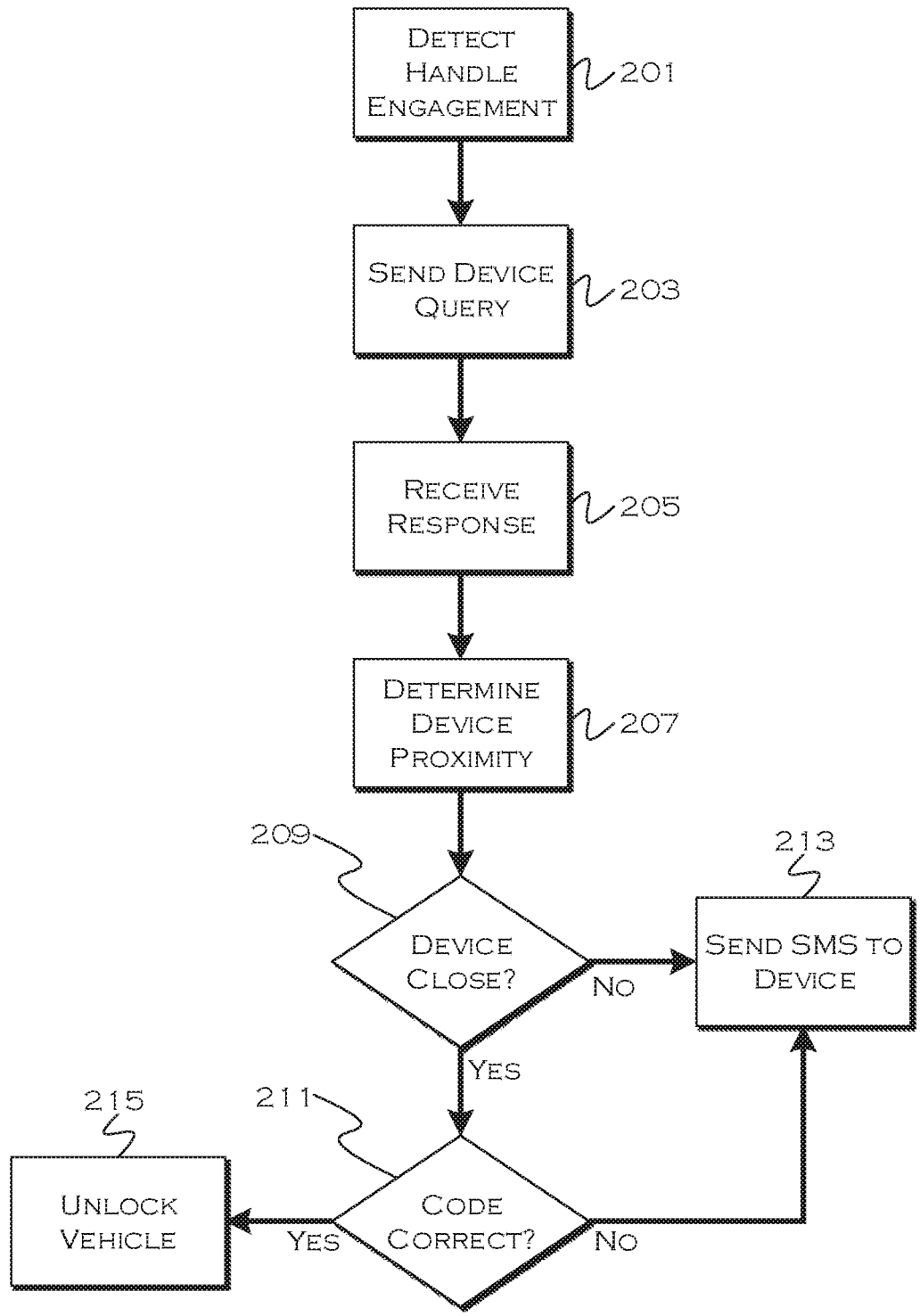
FIG. 2A shows an illustrative example of a code detection process.

FIG. 2A shows an illustrative example of a code detection process. In this illustrative example, the process detects 201 that a user hand has touched a capacitive door handle (or otherwise physically engaged the vehicle). In response to detecting the handle touch, the process sends 203 a query to a user wearable device, which, in this example, is storing an authentication code generated by the vehicle on a previous shut-down.

The process receives 205 a response from the user wearable device, including the code stored by the user wearable device. The process also includes a security measure to ensure that the user touching the door handle is also the user wearing the device (to prevent access by a person touching the vehicle while the actual user is still 50 feet away), and the process determines 207 device proximity with regards to the wearable device. This can include, for example, detecting a received signal strength indicator (RSSI) from the wearable device, indicating the strength of the query signal as detected by the wearable device. Other suitable means of determining proximity (NFC/RFID, BLE, etc) are also reasonable.

If the wearable device is sufficiently close 209 (e.g., within a predetermined proximity), then the process will determine 211 if the received device code is correct. If the wearable device is out of the predefined range, or the device code is incorrect, the process will exit, but the process may also send 213 a text or other message to a user device, to inform the user that an invalidated entry attempt was attempted. If the wearable device is within the proximity and the code is valid, the process may unlock 215 the vehicle.

In this example, the process validates the code from the device based on a locally stored code that was generated at a previous shut-down. Thus, both the device and local storage hold the same code (the code having been transmitted to the device). If the device has an invalid code, override steps are possible, as discussed with respect to some of the later following figures.

Figure 2B:
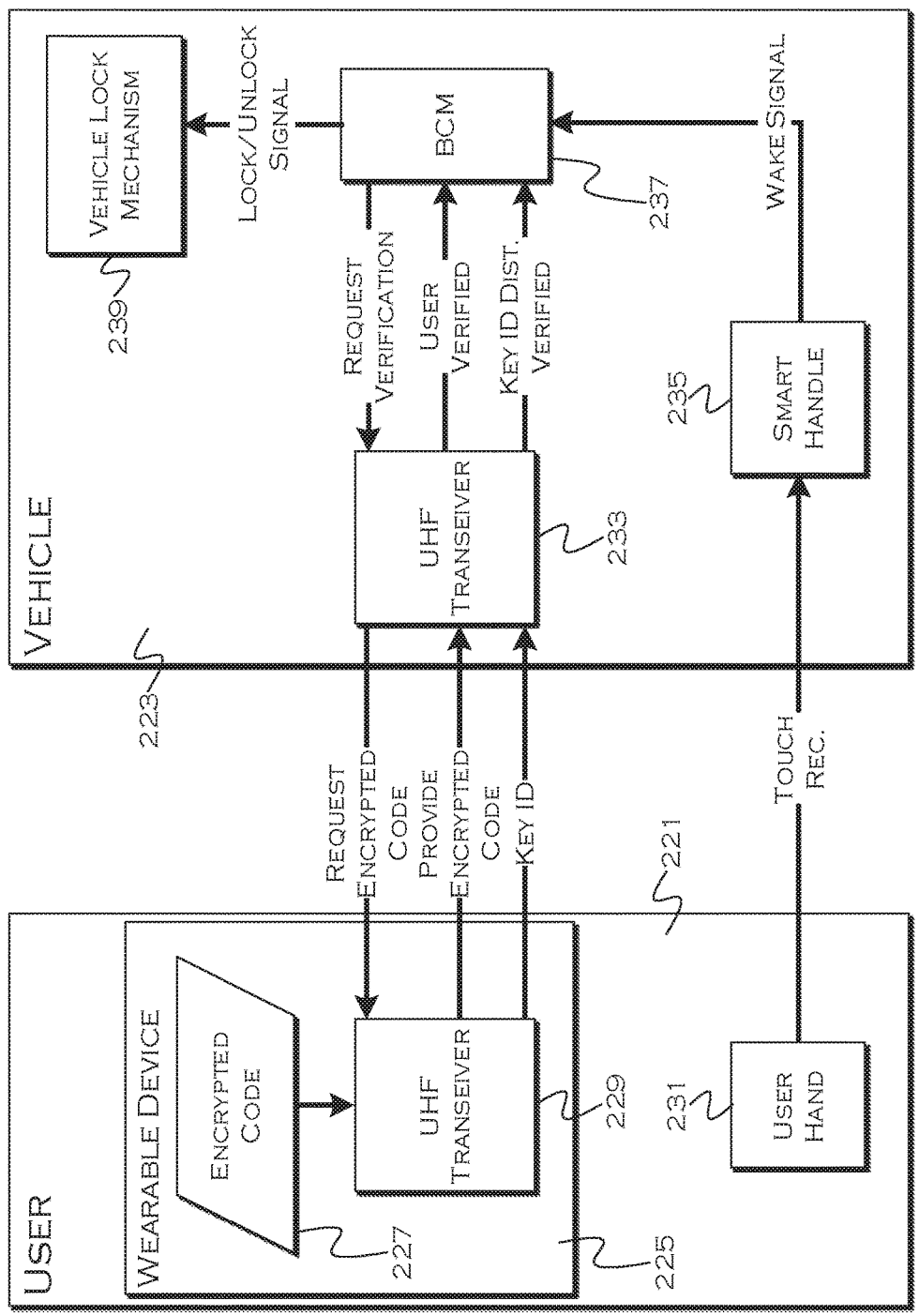
FIG. 2B shows an illustrative example of an unlock signal flow.

FIG. 2B shows an illustrative example of an unlock signal flow. In this example, a user 221 engages a vehicle surface (such as a capacitive handle) with the user's hand 231. This causes a touch recognition signal to be generated at the smart handle 235. The smart handle signals the body control module (BCM) 237 which sends a verification request to a vehicle transceiver module 233. The transceiver module sends a request for an encrypted code to a wearable device 225 transceiver module 229.

Responsive to the request, the wearable device transceiver module accesses a stored encrypted code 221, stored, in this example, at the previous vehicle shut-down. The wearable device transceiver module sends this code back to the vehicle transceiver module, and also sends a key ID code usable to determine the distance between the vehicle and the wearable device. The vehicle transceiver module can verify that the wearable device is within the appropriate distance (based on a predefined threshold, for example), and can verify the received encrypted code against the code stored locally on the vehicle. The vehicle transceiver module sends verification to the BCM, which sends an unlock signal to the vehicle lock mechanism 239 responsive to the verification of both items.

Figure 3A:
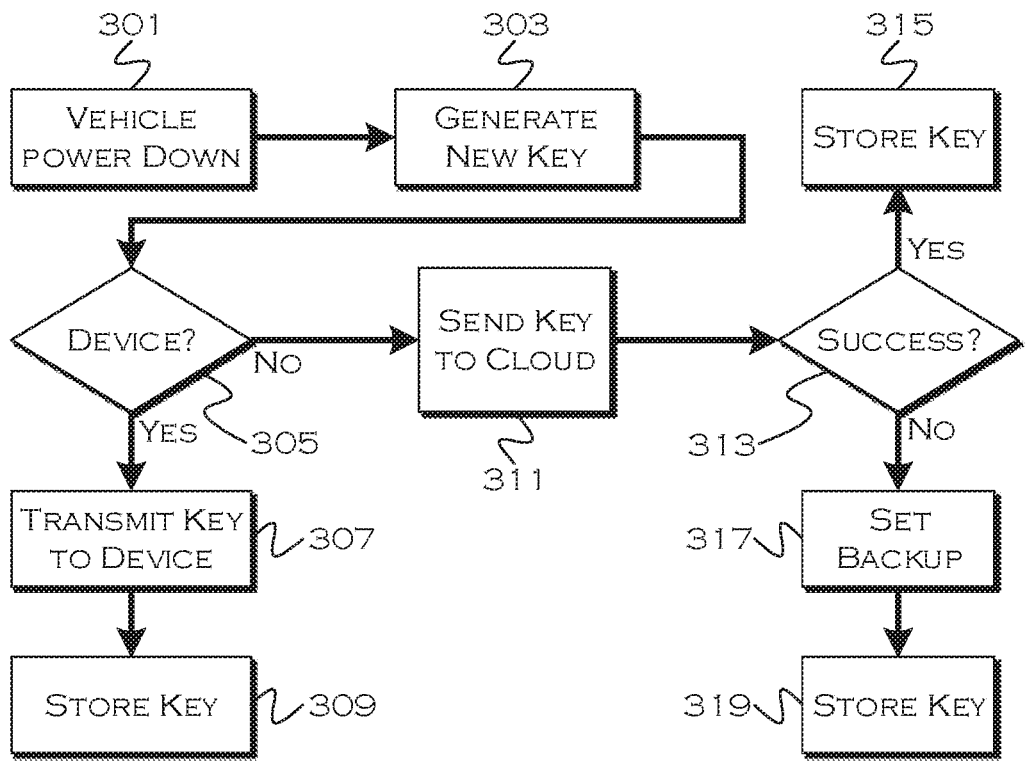
FIG. 3A shows an illustrative example of a vehicle power down sequence and key generation process.

FIG. 3A shows an illustrative example of a vehicle power down sequence and key generation process. In this example, the vehicle generates a new secret code, usable to at least start the vehicle, each time the vehicle is powered-down (and/or placed in park). The same code may be used for entry and startup, or a different code may be used by each process. In some embodiments, to prevent lockout if the user device was not powered at the last shutdown (and thus did not receive the new code), the entry code may be a fixed code and the new code may simply be used for startup. This would at least allow a user to enter a vehicle in inclement weather while any startup code issues were resolved (as discussed with respect to FIG. 4).

In this example the vehicle generates the code upon shutdown, but the code could also be generated based on other state changes, such as, but not limited to, park events, proximity to destination, other driving events, etc. Another alternative is to generate the new code as soon as the old key is used, invalidated (after use) and the appropriate wireless device (for receiving the new code) is connected.

In this example, the process detects 301 a vehicle power down (and/or park state) and responsively generates a new code 303. Since the code will be transmitted to the user wireless device for later use, the process also determines 305 if the user wearable device is present and connected. If the device is present and connected, the process will transmit 307 the new code to the device and store 309 a copy of the newly generated code locally.

If the device is not detected, either because the device is not connected or because the device is unpowered, for example, the process will attempt to send a copy of the new code to the cloud 311. Many wearable devices have cloud access (direct 3G or via BT connection to a parent cellular device) and can thus obtain a connection with a cloud account. So, for example, if the wearable device is unpowered and out of battery, the user can charge the device while away from the vehicle, and the device can connect to the cloud to obtain the new code. If the vehicle successfully sends 313 the key to the cloud, the process can locally store 315 a copy of the code. If the vehicle does not successfully connect, the process can set 317 an internal backup flag and locally store 319 the code.

The backup flag can be set at any time the vehicle is unsuccessful in transferring the code to the user device, regardless of whether or not the vehicle can connect to the cloud. This flag (or a similar indicator) instructs the vehicle to "know" that the user device may not have the correct code. If the user device is powered when the user approaches the vehicle after having left for a time, the communication process will not result in authentication, unless the user device has obtained the code from the cloud. The vehicle, however, may "expect" this result, and can engage in a secondary override process to either allow the user to directly enter the vehicle or to transmit the code(s) to the device at the moment the user approaches. This could involve, for example, simple direct transmission of the code when the device connects, or it could involve entry of a PIN or password to authenticate the swap.

Figure 3B:
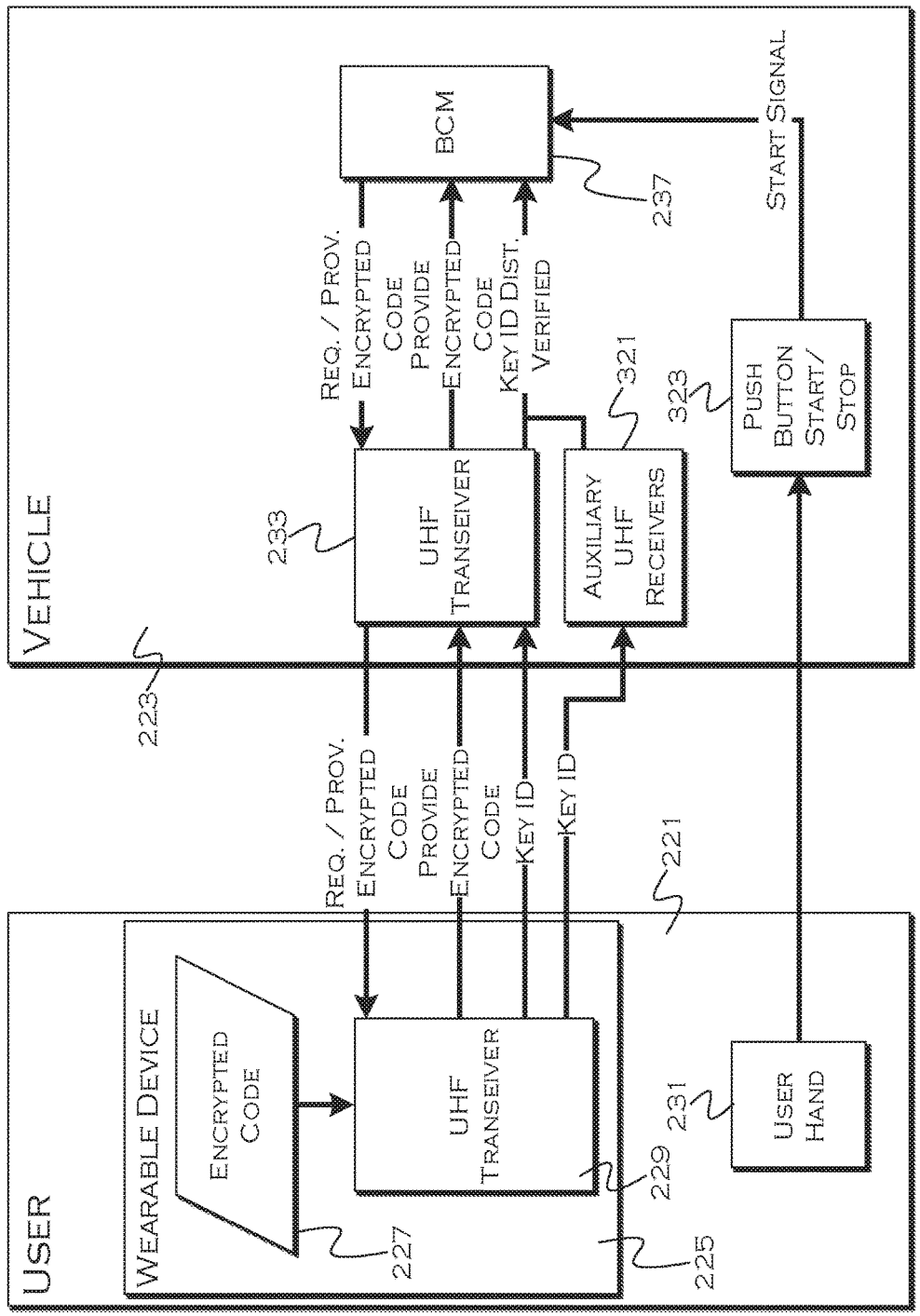
FIG. 3B shows an illustrative example of a vehicle startup process signal flow.

FIG. 3B shows an illustrative example of a vehicle startup process signal flow. In this example, the user 221 uses their hand 231 to engage a vehicle push button start 323. This start button sends a start signal to the body control module 237.

Responsive to the start signal, the BCM requests a start code (which may be the same or different from the entry code) from the vehicle primary transceiver module 233. The vehicle transceiver module 233 sends a request to the wearable device transceiver module 229, requesting the encrypted start code 227 stored in vehicle memory. The transceiver module on the wearable device responds with the start code and, in this example, the transceiver module also broadcasts a key ID, usable to determine distance to the wearable device from transceivers receiving the key ID.

In this example, the system will ensure that the wearable device is within a vehicle cabin before starting the vehicle, so the primary transceiver module and one or more secondary transceiver modules 321 receive the key ID from the wearable device. Based on RSSI and relative positioning, or other similar device-location techniques, the process can determine whether or not the wearable device is within a vehicle. If the encrypted key is correct and the wearable device is within the vehicle, the system sends the relevant information to the BCM. The determinations about validity of the code and device location can also be made at the BCM. If everything checks out, the BCM starts the vehicle engine.

Figure 3C:
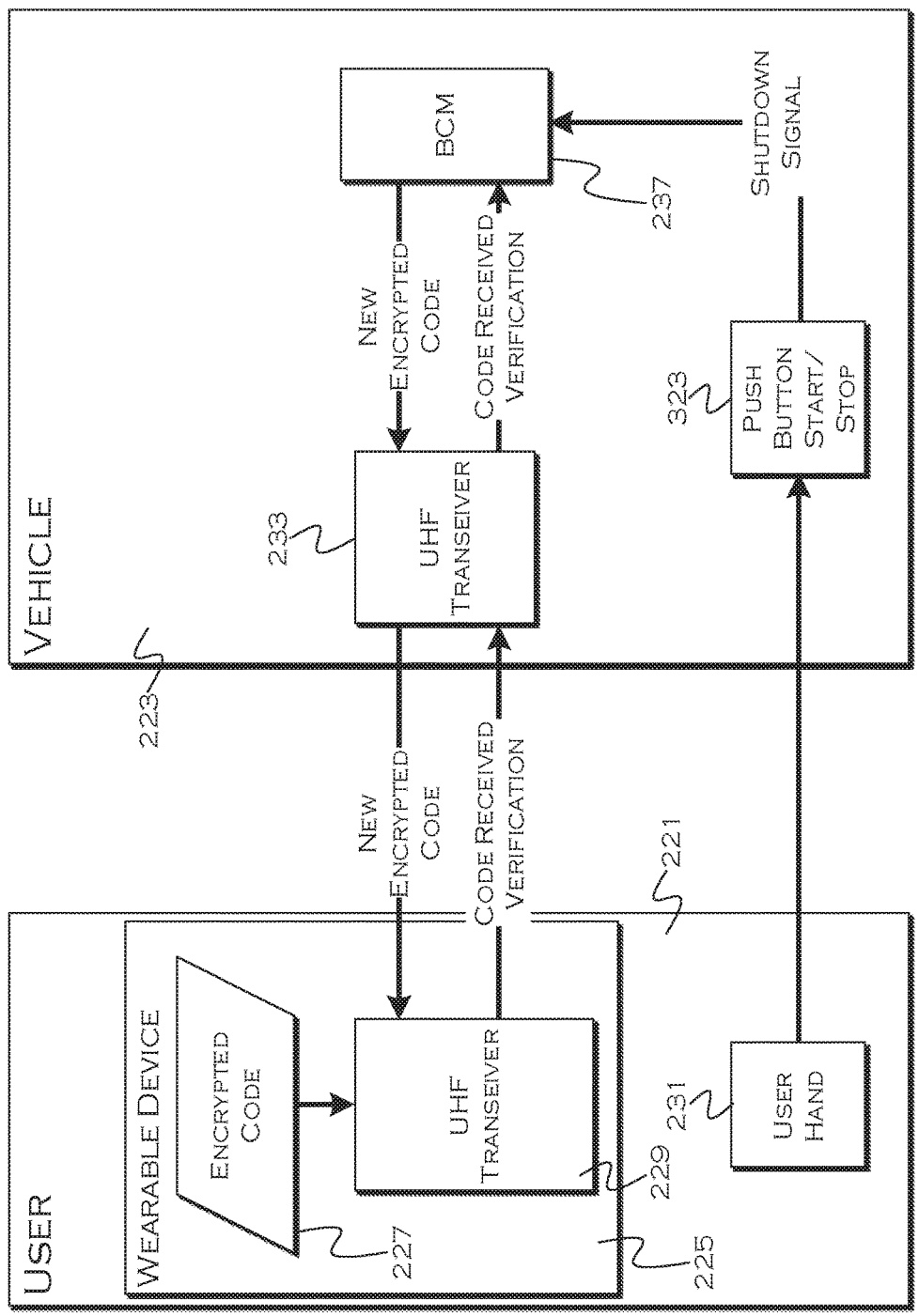
FIG. 3C shows an illustrative example of a shutdown signal flow process.

FIG. 3C shows an illustrative example of a shutdown signal flow process. In this illustrative example, the user 221 engages the start/stop 323 button with their hand 231. The button sends a shutdown signal to the BCM 237. In response to shutdown (and/or park), the BCM generates a new encrypted code and sends the code to the vehicle transceiver module 233. As previously noted, the trigger for key generation can include a variety of vehicle-state changes or even an application request or other exterior trigger.

The vehicle transceiver module sends the code to a connected wearable device 225, where the code is received by the device transceiver module 227. The wearable device stores the new code 227 locally, and responds to the vehicle transceiver module with a receipt verification. This verification is passed to the BCM, so the vehicle "knows" that the user wearable device received the newly generated code.

Figure 4:
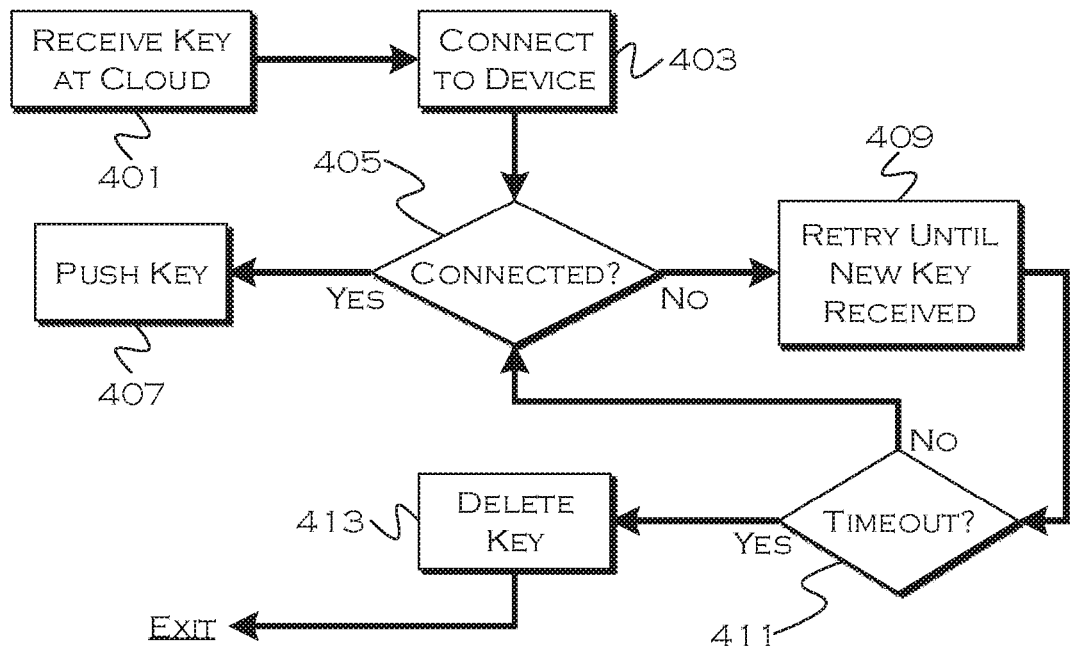
FIG. 4 shows an illustrative example, of a key queuing process at the cloud.

FIG. 4 shows an illustrative example, of a key queuing process at the cloud. In this example, the vehicle was unable to successfully transmit the newly generated key to the user wearable device, and so the vehicle requested that the key be stored in the cloud for remote access by the wearable device before vehicle restart is requested.

The cloud server receives the key 401 and any relevant device identifying and/or vehicle identifying data. The cloud then attempts a connection with the wearable device 403. In other models, the cloud may wait for the wearable device to attempt the connection, or detect a connection established for another purpose and then send a request to the wearable device.

Once the system is connected or a connection request is favorably responded to 405, the process will push 405 the key to a known device. For example, the device ID could have been sent to the cloud along with the newly generated key. In other examples, the wearable device or cellular device (which may transfer the key to the wearable device) may be associated with a user account, with which the key is also associated, and this can be the basis for key delivery. In still other examples, some form of authentication (PIN, password) may be required.

If no connection is established, the cloud can continue attempting 409 to deliver the key until a timeout is reached 411 (or, for example, a new key is delivered). Once the old key is invalid because of a timeout or new key delivery, the process may delete 413 the old key, to avoid pushing an invalid key to the phone. The timeout may be a period of days, for example, preserving the validity of the newly generated key for some time if a new key is not received. In the future, if the vehicle generated a new key, the vehicle may notify the cloud or deliver the new key to the cloud, causing invalidation and deletion of the old key.

Figure 5:
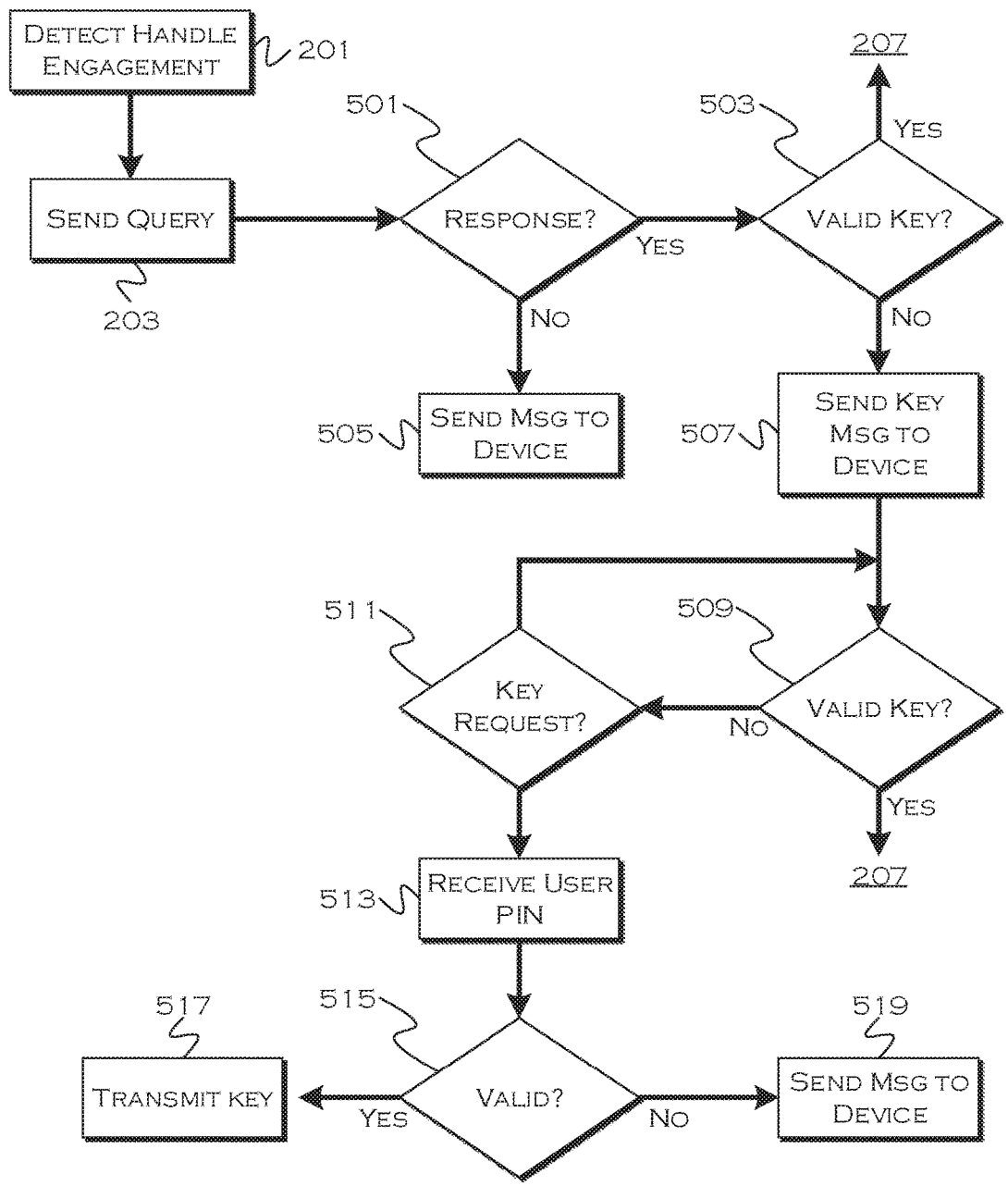
FIG. 5 shows an illustrative example of a local key backup delivery process.

FIG. 5 shows an illustrative example of a local key backup delivery process. In this example, the user wearable or other key-storing device was not connected at the time of vehicle shutdown, and the device was unable to receive the key from the cloud. To prevent the user from being permanently locked out of the vehicle, the process will attempt to deliver a locally stored version of the current key to a known device, when the user tries to enter the vehicle with the device storing an invalid old key. In this example, the process detects 201 engagement of the vehicle handle and sends 203 the typical query to the user device requesting the key.

It may be the case that the vehicle "knows" that the key was not successfully delivered, but the vehicle may attempt a standard connection in case the user device was able to obtain the key from the cloud while the user was away from the vehicle. If the process does not receive a response 501, the process may send 505 a message to the user wearable device, and/or to a user secondary device (e.g., cell phone) indicating that the wearable device should be turned on and communication should be enabled. The process can then repeat the attempt, after waiting a period of time.

If the process receives a response, and the received encrypted code/key is valid 503, the process may proceed to step 207 of FIG. 2. If the key is invalid, the process may send 507 instructions for the device to attempt to obtain the key from the cloud. In this example, local key retrieval requires a PIN, and cloud key retrieval does not, so the system first instructs the device to attempt to retrieve the key from the cloud, in order to minimize user involvement. If the device responds with a valid key 509, obtained from the cloud, the process proceeds to step 207.

If the device is unable to obtain the key from the cloud, the device may issue a local key request. If the process receives a request 511 for a local key delivery, while waiting for the valid key delivery, the process may request a user PIN or password. The process receives 513 the user PIN or password (entered on the device or on a vehicle interface, such as a door touchpad). If the PIN or password is valid 515, the process may locally transmit the key to the expected device 517. If the password or PIN is invalid, the process may send 519 a message to the wearable and/or a cellular phone indicating that an invalid attempt to obtain a local key was processed.

Through use of the illustrative embodiments, a secure and repeatable process for key generation and utilization is obtained. The system is resilient against replay attacks, and is capable of consistently providing new keys and using those keys as the basis for entry and/or vehicle startup.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
generate a new access key, responsive to a vehicle state-change;
attempt to connect to a previously identified user wireless device;
locally store the new access key in conjunction with a key backup process, responsive to a failure to connect to the previously identified user wireless device;
execute the key backup process, to deliver the locally stored new access key to the wireless device, responsive to:
a user attempt to use an invalid access key;
receipt of a user authentication code; and
verification of the authentication code.

2. The system of claim 1, wherein the state-change includes vehicle shut-down or park engagement.

3. The system of claim 1, wherein the state-change includes proximity to a known destination.

4. The system of claim 1, wherein the processor is configured to attempt to deliver the new access key to a cloud server, responsive to a failure to connect to the previously identified user wireless device.

5. The system of claim 4, wherein the processor is configured to instruct the wireless device to obtain the new access key from the cloud server, responsive to a user attempt to use an invalid access key.

6. The system of claim 1, wherein the processor is configured to send an alert message to a user wireless phone responsive to an unsuccessful attempt to verify the user authentication code.

7. The system of claim 1, wherein the processor is configured to:
receive a request to access a vehicle;
request a copy of a device-stored access key;
receive the requested device-stored access key;
compare the received device-stored access key to a locally stored copy of the new access key; and
provide the requested vehicle access responsive to the comparison resulting in a match.

8. The system of claim 7, wherein the processor is configured to send an alert message to a user wireless phone responsive to an unsuccessful attempt to match the received device-stored access key and the locally stored copy of the new access key.

9. A method comprising:
generating an access key, responsive to a vehicle state-change;
attempting connection to a predefined wireless device;
locally storing the access key in conjunction with a backup process, responsive to failure of the connection attempt;
wirelessly delivering the locally stored access key to the wireless device, via the backup process, responsive to:
a user attempt to use an invalid access key;
receipt of a user authentication code; and
verification of the authentication code.

10. A non-transitory computer readable storage medium, storing instructions which, when executed by a vehicle processor, cause the processor to perform the method comprising:
generating an access key, responsive to a vehicle state-change;
attempting connection to a predefined wireless device;
locally storing the access key in conjunction with a backup process, responsive to failure of the connection attempt;
wirelessly delivering the locally stored access key to the wireless device, via the backup process, responsive to:
a user attempt to use an invalid access key;
receipt of a user authentication code; and
verification of the authentication code.

* * * * *